US012804407B2

(12) United States Patent
Froehlich et al.

(10) Patent No.: US 12,804,407 B2
(45) Date of Patent: Nov. 17, 2026

(54) SYSTEMS AND METHODS FOR MULTI-OBJECTIVE RADIO NETWORK OPTIMIZATION

(71) Applicant: NetScout Systems, Inc., Westford, MA (US)

(72) Inventors: Robert W. Froehlich, McKinney, TX (US); Wing F. Lo, Plano, TX (US); Karsten Gaenger, Berlin (DE)

(73) Assignee: NetScout Systems, Inc., Westford, MA (US)

( * ) Notice: Subject to any disclaimer, the term of this patent is extended or adjusted under 35 U.S.C. 154(b) by 323 days.

(21) Appl. No.: 18/405,994

(22) Filed: Jan. 5, 2024

(65) Prior Publication Data

US 2025/0227480 A1 Jul. 10, 2025

(51) Int. Cl.
*H04W 4/00* (2018.01)
*H04W 16/10* (2009.01)

(52) U.S. Cl.
CPC .................................. *H04W 16/10* (2013.01)

(58) Field of Classification Search
None
See application file for complete search history.

(56) References Cited

U.S. PATENT DOCUMENTS

2015/0023163 A1* 1/2015 Gonzalez ............ H04L 41/0833 370/230
2022/0376740 A1* 11/2022 Razavi Majomard ... H04B 3/32

FOREIGN PATENT DOCUMENTS

WO WO-2021041455 A1 * 3/2021 ............... G06F 8/70
WO WO-2023274522 A1 * 1/2023 ........... H04L 1/0025

* cited by examiner

*Primary Examiner* — Zewdu A Beyen
(74) *Attorney, Agent, or Firm* — Foley & Lardner LLP

(57) ABSTRACT

Systems and methods for multi-objective radio network optimization is provided. A system may collect multiple network data packets from network monitoring equipment connected to a communications network. The system may execute a model using the network data packets as input. The model may be an optimization model or a machine learning model. The model may generate network configuration parameters for the communication network. The model may be configured with predetermined weights for multiple performance metrics. The model may be trained to generate the network configuration parameters that optimize multiple performance metrics. The system may adjust the communications network according to the generated network configuration parameters.

20 Claims, 8 Drawing Sheets

603

SYSTEMS AND METHODS FOR MULTI-OBJECTIVE RADIO NETWORK OPTIMIZATION

BACKGROUND

A wireless communication network can be configured to accommodate communication between different communication devices. However, due to the complexity of wireless communication and conflicting variables, it can be challenging to optimize the network configuration for multiple use cases.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
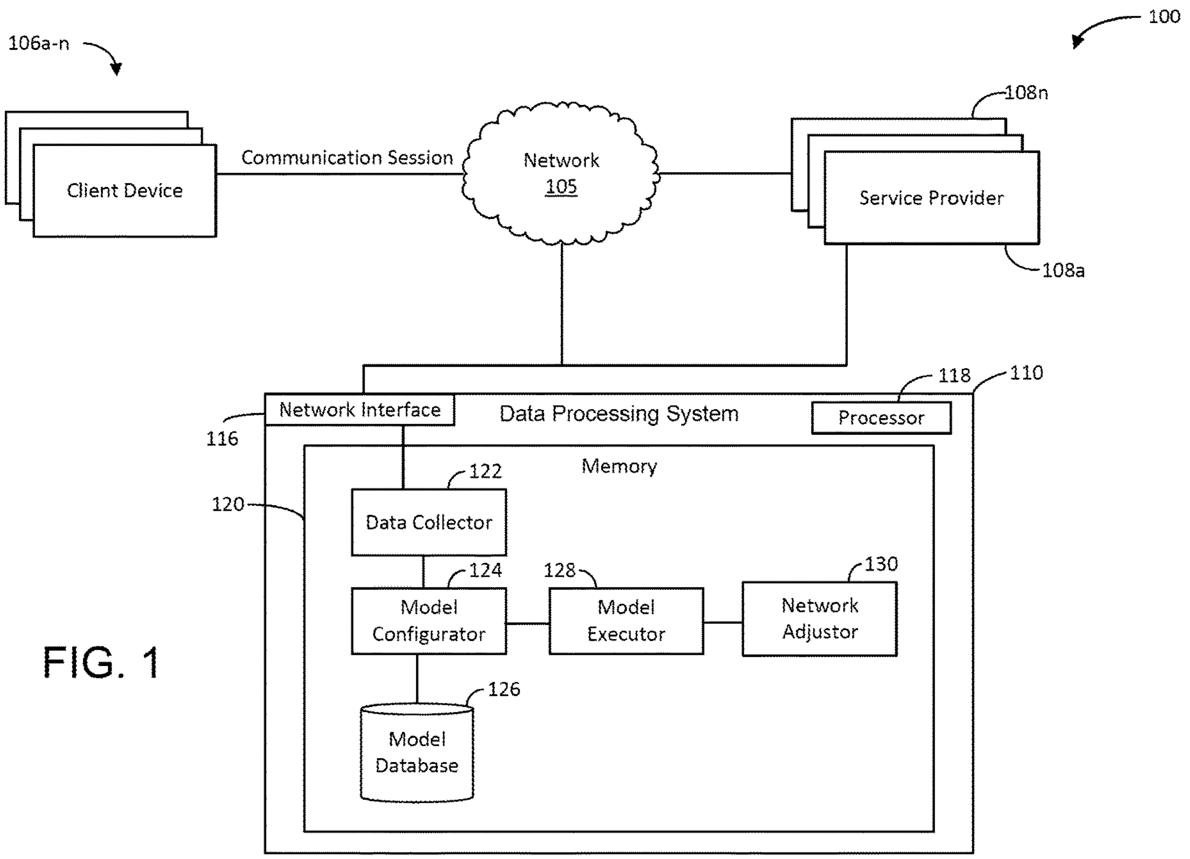
FIG. 1 is an illustration of a system for multi-objective radio network optimization, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some network communications systems may employ various techniques to optimize network configuration. The systems may configure wireless communication networks by determining values for different network configuration parameters (e.g., quality of service, signal strength, frequency band, transmission power, etc.) to optimize the network for a single network objective. The objective may be to optimize the network for low rate of dropped calls, for a high signal to noise ratio, or another objective. For example, some systems may use cluster optimization to optimize the network for a single objective. Cluster optimization may include selecting a cell cluster (e.g., 100 base stations, 300-500 cells) and selecting a single objective for the cell cluster. The system may obtain a geoanalytic heat map depicting good and poor key point indicator (KPI) conditions. The system may input a network element table (e.g., frequency, antenna type, azimuth, tilt, etc.) for the geospatial KPI, such as to describe the physical location and/or deployment layout. In response, the system may execute an algorithm to provide per cell recommendations for improving the single objective. An operator may implement the recommendations and iteratively run the process per cell or for a cluster of cells (e.g., for multiple cells, such as multiple cells that are touching or immediately adjacent to one another). Once a per cell or per cluster of cells objective KPI meets an operator's goal (e.g., a threshold value, threshold KPIs), the cell or cluster of cells is considered optimized for the single objective. However, if the operator attempts to evaluate another, secondary objective, such as cell edge network capacity, the system may perform the optimization process again for the second objective, which may cause the network to lose optimization for the first objective (e.g., a first objective of coverage may be adversely impacted by a second objective of capacity). Due to the single objective nature of the system and algorithms used, optimization of a network may be highly iterative, inefficient, have a high resource cost, and may not support multi-objective optimization.

The techniques described herein may overcome the aforementioned technical deficiencies. For example, the techniques may provide for simultaneously optimizing multiple radio network objectives (e.g., key performance metrics). For instance, a first objective may be coverage and a second objective may be capacity. Network coverage may refer to a geographic area where a wireless signal can be received with a level of quality. Coverage may be an extent of an area where a wireless signal can reach a user equipment (UE) and provide reliable communication. Network capacity may refer to an amount of data that can be transmitted over a wireless network within a given period of time.

In some cases, capacity and coverage may be conflicting objectives. For instance, expanding a coverage area by increasing transmission power can lead to interference with other signals and reduce network capacity. Similarly, increasing network capacity by adding more users (e.g., UEs) or increasing data rates can reduce network coverage area. Therefore, simultaneously optimizing radio network coverage and capacity objectives may include balancing trade-offs between the two performance metrics. To balance the trade-offs, a wireless network infrastructure (e.g., base stations, antennas, signal processing algorithms) may be designed (e.g., configured, optimized, adjusted) to maximize multiple objectives (e.g., coverage and capacity) while minimizing negative network metrics (e.g., interference) and maintaining quality of service. For example, a computer, such as a data processing system, may collect network data packets (e.g., signals, messages, requests, responses) from network monitoring equipment connected to a communications network. The processing system may execute a model to generate network configuration parameters for the communication network according to two or more configured performance metrics (e.g., network objectives) based on the collected network packets. The data processing system may adjust the communications network according to the generated parameters.

In some embodiments, the model may be a machine learning model. For example, the machine learning model may be a reinforcement learning (RL) model, among other types of models. The RL model may use trial-and-error learning to optimize performance of a system. For radio network optimization, RL can be used to learn a policy that balances multiple objectives (e.g., coverage and capacity objectives). The policy may be a mapping between a network state and actions that a network controller (e.g., a network operator, a data processing system) may perform to optimize the objectives. The network state can include information such as user traffic demand, channel conditions, and interference levels, among other information. The actions can include adjusting transmission power, antenna orientation, and resource allocation, among other actions.

In some cases, the RL model may use a reward function. The reward function may include providing feedback on network performance. The RL model may use the reward function and feedback to guide learning for optimizing the multiple objectives. The reward function may be designed to reflect trade-offs between the various objectives being processed. For instance, the reward may be a weighted sum of coverage and capacity metrics, where the weights may reflect the relative importance of each objective. In some cases, the RL model may be trained using simulations (e.g., test data) or real-world data.

In some embodiments, the model may be an optimization model. For example, the optimization model may be a multiple-objective evolutionary algorithm (MOEA) model, among other types of models. The MOEA model may be a type of evolutionary algorithm that uses a population of candidate solutions and evolves them over multiple generations to find a balanced (e.g., best) trade-off between multiple objectives. The MOEA model may generate a set of candidate solutions that represent different network configurations. The MOEA model may evaluate each candidate solution based on performance with respect to the various objectives being processed. In some cases, the MOEA model may use one or more simulation models based on various factors (e.g., propagation models, channel conditions, traffic patterns, and interference) to evaluate the candidate solutions. In response to evaluating the solutions, the MOEA model may apply selection, recombination, and mutation operators to the candidate solutions to generate new solutions (e.g., offspring solutions, child solutions).

In some cases, the MOEA model (e.g., operators of the model) may be designed to promote diversity and convergence towards a Pareto-optimal front, which represents a set of non-dominated solutions that cannot be improved in one objective without worsening the other. The network controller may use the Pareto-optimal front to guide decision-making by selecting a solution that represents the best trade-off between the various objectives (e.g., cell coverage and capacity). By using MOEA guided by Pareto-optimal front, the network controller may explore trade-offs between the objectives being processed and identify solutions that are most suitable for the needs of the network. While the given examples are directed to a single type of machine learning model and a single type of optimization model, other models can be used to achieve multi-objective optimization for a network and are considered.

The techniques described herein may result in various advantages over aforementioned technical deficiencies. For example, executing a multi-objective model to generate network configuration parameters optimized for multiple key performance metrics and adjusting a communications network according to the generated metrics may result in a more efficient system that can achieve both coverage and high capacity, increased user experience, reduced overhead, increased resource management, and a more optimized communication network, among other advantages.

FIG. 1 is an illustration of a system 100 for multi-objective radio network optimization, in accordance with an implementation. The system 100 may enable multi-objective radio network optimization by using an optimization model. In brief overview, the system 100 can include, access, or otherwise interface with one or more of a data processing system 110 (e.g., a network device, a probe, an inspection device), that receives and/or stores data packets transmitted via a network 105 between client devices 106*a-n* (hereinafter client device 106 or client devices 106) and service providers or cloud providers 108*a-n* (e.g., an internet service provider (ISP), cloud providers 108, service providers 108). The service providers 108 can each include a set of one or more servers 602, depicted in FIG. 6A, or a data center 608. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with each other via the network 105 or directly.

Each of the client devices 106, the service providers 108, and/or the data processing system 110 can include or utilize at least one processing unit or other logic device such as programmable logic array engine, or module configured to communicate with one another or other resources or databases. The components of the client devices 106, the service providers 108, and/or the data processing system 110 can be separate components or a single component. In some embodiments, the data processing system 110 may be an intermediary device (e.g., a network monitoring device, network monitoring equipment, a remote device) between the client devices 106 and the service providers 108. The system 100 and its components can include hardware elements, such as one or more processors, logic devices, or circuits.

The client devices 106, the service providers 108, and/or the data processing system 110 can include or execute on one or more processors or computing devices (e.g., the computing device 603 depicted in FIG. 6C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be hosted by a third-party cloud service provider via a virtual environment. The service provider 108 can be hosted in a public cloud, a co-location facility, or a private cloud. The service provider 108 can be hosted in a private data center, or on one or more physical servers, virtual machines, or containers of an entity or customer. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 610 depicted in FIG. 6B.

The client device 106 can establish communication sessions with the service providers 108 to receive data from the cloud providers 108. For example, a user associated with the client device 106 may request a service. Responsive to the request, a cloud provider 108 associated with the service may send requested data to the client device 106 in a communication session. In some cases, the request may be a bad request. For example, the request may be a nonexistent DNS query. The cloud provider 108 may send a response including an NXDOMAIN error (e.g., a response code). Each type of incorrect request may be associated with a respective response code. The client devices 106 may establish communication sessions with the cloud providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For instance, the geographic location may be serviced by one or more cells or a cluster of cells. The client device 106 may access the network via one or more network nodes (e.g., a base station, a cell tower, a network device) included in the cells. For example, a user can use a client device 106 to access the Internet at home, as a passenger in a car, while riding a bus, in the park, at work, while eating at a restaurant, or in any other environment serviced by the network nodes. The client device 106 can be deployed at a separate site, such as an availability zone managed by a public cloud provider (e.g., a cloud 610 depicted in FIG. 6B). If the client device 106 is deployed in a cloud 610, the client device 106 can include or be referred to as a virtual client device or virtual machine. In the event the client device 106 is deployed in a cloud 610, the packets exchanged between the client device 106 and the service providers 108 can still be retrieved by the data processing system 110 from the network 105. In some cases, the client devices 106 and/or the data processing system 110 can be deployed in the cloud 610 on the same computing host in an infrastructure 616 (described below with respect to FIG. 6B).

The data processing system 110 may comprise one or more processors that are configured to obtain network data packets from the service providers 108 during a communication session between the client device 106 and the service providers 108. The data processing system 110 may comprise a network interface 116, a processor 118, and/or memory 120. The data processing system 110 may communicate with any of the client devices 106, the service providers 108, or another device, via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a model configurator 124, a model database 126, a model executor 128, and a network adjustor 130. The model database 126 may be a database (e.g., relational, non-relational, object oriented) that stores predetermined weights, historic data, training data, model feedback, machine learning models, optimization models, network parameters, network metrics, and other data associated with multi-objective optimization. Any of the components of the data processing system 110 may query, obtain from, modify, or otherwise access the model database 126. The data processing system 110 may further include other components, managers, handlers, etc. to perform the techniques as described herein. In brief overview, the components 122-130 may collect network data packets from network monitoring equipment connected to a communications network (e.g., packets associated with a communication session between the client device 106 and a network service provider 108). The components 122-130 may execute a model using the network data packets as input to generate network configuration parameters for the communication network. The model may be configured with predetermined weights for multiple performance metrics (e.g., network objectives) for the communications network. The model may be trained to generate network configuration parameters that optimize the multiple performance metrics for the communications network. Responsive to generating the network configuration parameters, the components 122-130 may adjust the communications network according to the generated network configuration parameters.

The data collector 122 may comprise programmable instructions that, upon execution, cause the processor 118 to collect (e.g., receive, obtain) data (e.g., network data packets) transmitted between the client devices 106 and the service providers 108 as part of one or more communication sessions. For example, the client device 106 may send a request for a service to the service provider 108. The service provider 108 may send a response to provide the service to the client device 106. The data collector 122 may collect the response and the request from network monitoring equipment connected to the network 105.

The model configurator 124 may comprise programmable instructions that, upon execution, cause the processor 118 to configure a model. In some embodiments, the model may be an optimization model. For instance, the optimization model may be an MOEA model. The MOEA model may be an MOEA model based on decomposition (MOEA/D). The model configurator 124 may initialize a feature set with a set of candidate solutions (e.g., current RAN configuration) that includes initial knowledge-based rules. The knowledge-based rules may include expert knowledge and domain-specific rules. The rules can be based on previous experience (e.g., historical data), heuristics, or known problem characteristics. The model can be any type of optimization model.

To initialize the feature set, the model configurator 124 may define the rules. For instance, a first rule may be: if a problem exhibits specific symmetries or regularities, initialize the population with solutions that reflect these patterns. A second rule may be: if certain decision variables have known dependencies or constraints, generate initial solutions that satisfy those dependencies. A third rule may be: if there are known preference orders or priority levels among objectives, initialize the population with solutions that reflect these preferences. The model configurator 124 may apply the rules. For instance, the model configurator 124 may apply the rules during the initialization phase of MOEA/D to generate an initial population of solutions. The model configurator 124 may incorporate the rules into a solution generation procedure to ensure the generated solutions adhere to knowledge-based constraints, preferences, or patterns. The model configurator may evaluate and improve the MOEA/D. For instance, the model configurator 124 may evaluate the initial population of solutions based on multiple performance metrics for the network 105 (e.g., problem objects and constraints). If the initial solutions do not satisfy a threshold (e.g., desired quality or diversity criteria), then the model configurator 124 may apply additional procedures (e.g., diversity enhancement techniques, local improvement methods) to refine the population.

The model configurator 124 may configure the optimization model with one or more predetermined weights for multiple performance metrics for the network 105. For example, the model configurator 124 may query the model database 126 for the predetermined weights. The model configurator 124 may assign the weights (e.g., weight vectors) to network configuration parameters (e.g., features) associated with the performance metrics (e.g., selected parameters to be adjusted for optimizing the performance metrics). The weight vectors may guide the optimization process by decomposing the multi-objective problem into multiple subproblems (e.g., each target objective).

The model executor 128 may comprise programmable instructions that, upon execution, cause the processor 118 to execute the model to generate values for multiple network configuration parameters. For instance, for each subproblem, the model executor 128 may evaluate a fitness of the network configuration parameters. The model executor 128 may select target objectives using one or more selection strategies (e.g., defined in knowledge based (KB) rules, improved inferences, a machine learning decision tree, random forest, or logic determine during a machine learning process). In one example, a KB rule can be input by an expert. For instance, a Berlin RAN expert may input rules that the expert inferred from data over time. Such rules can begin or seed the process. The model executor 128 may generate an outcome of the evaluation of each subproblem. The model executor 128 may apply evolutionary operators to the initial and forecasted target objectives (e.g., performance metrics) to create new solutions. The model executor 128 may update target function factors by selecting the fittest conditions that were evaluated. In response to updating the target function factors, the model executor 128 may determine neighboring subproblems for each subproblem based on the weights. The model executor 128 may select solutions using a similar process as the subproblems. The model executor 128 may update the target objectives by incorporating the selected solutions. By doing so, the model executor 128 can ensure diversity and convergence towards the Pareto front. The model executor 128 may check if termination conditions (e.g., coverage and capacity thresholds) are met. For instance, the model configurator 124 may determine thresholds for the performance metrics. The thresholds may include a maximum number of generations reached (e.g., a threshold of solutions generated) or a threshold convergence level. Upon determining the termination conditions are met, the model executor 128 may obtain an output from the optimization model. The output may include values for the network configuration parameters to optimize the network for the performance metrics. The output may include a set of non-dominated solution recommendations, representing the trade-offs between the objectives in the form of the Pareto front.

In some embodiments, the model may be a machine learning model. For instance, the machine learning model may be a reinforced learning (RL) model. The model configurator 124 may configure the RL model using a training data set. For example, the model configurator 124 may query the model database 126 for the training data set. The training data set may include historical data, preconfigured training data, current data, or other types of network data. The model configurator 124 may train the model to optimize multiple objectives at once. For instance, the model configurator 124 may use a reward function to train the RL model. The reward function may be designed to reflect trade-offs between the various objectives being processed. For instance, the reward may be a weighted sum of coverage and capacity metrics, where the weights may reflect the relative importance of each objective. In some cases, the reward function may include providing feedback on network performance. The feedback may indicate whether applying output of a first round of training to a network (e.g., a simulation network) causes the performance metrics of the network to satisfy one or more thresholds for the performance metrics. Based on the feedback, the model configurator 124 may tune one or more hyperparameters of the RL model and retrain the RL model. In some cases, the model configurator 124 may train multiple RL models. For example, the model configurator 124 may train a first RL model for a first geographical area and a second RL model for a second geographical area, as described herein with reference to FIG. 2. Additionally, or alternatively, the model configurator 124 may train an RL model for a first time period and an RL model for a second time period, as described herein with reference to FIG. 3. The model executor 128 may execute the one or more trained RL models to generate values for network configuration parameters. In some cases, a combination of the optimization model and the machine learning model may be used as one or more models to optimize multiple objectives.

The network adjustor 130 may comprise programmable instructions that, upon execution, cause the processor 118 to adjust the network 105. The network adjustor 130 may adjust the network 105 according to the generated network configuration parameters. For example, the network adjustor 130 may adjust corresponding network configuration parameters of the network 105 to values of the generated network configuration parameters. In some cases, to adjust the corresponding network configuration parameters of the network 105, the network adjustor 130 may send the generated network configuration parameters to an external device (e.g., a display, a network controller, a network configuration device, an external data processing system). The external device may automatically implement the configuration changes, or an operator of the external device may implement the configuration changes.

In some cases, the performance metrics (e.g., network objectives) may include signal strength, coverage probability, QoS, interference management, dropped connection ratio, capacity, uplink and downlink throughput, energy consumption, quality of service class identifier (QCI)/5G QOS Indicator (5QI) quality indicators, or latency, among other metrics. For instance, signal strength may aim to maximize the signal strength at a receiver to ensure reliable communication. The signal strength can be quantified using metrics such as received signal strength indicator (RSSI), signal-to-noise ratio (SNR), or reference signal received power (RSRP). The performance metric can be achieved by adjusting the transmission power, the antenna orientation, and the cell layout. Coverage probability may aim to maximize the probability that the signal strength at the receiver is above a certain threshold. The coverage probability can be quantified using metrics such as coverage probability per square kilometer or per user. The performance metric can be achieved by optimizing the cell placement, the cell radius, and the antenna parameters. QoS may aim to ensure that the network meets the user requirements for data rate, latency, and reliability. The QoS can be quantified using metrics such as throughput, packet loss rate, and delay. The performance metric can be achieved by optimizing resource allocation, modulation and coding scheme, and scheduling algorithms. Interference management may aim to minimize interference between neighboring cells to improve network performance and avoid congestion. Interference can be quantified using metrics such as interference-to-noise Ratio (INR) or signal-to-interference-plus-noise ratio (SINR). The performance metric can be achieved by optimizing frequency reuse, power control, and handover algorithms.

In some cases, the network configuration parameters may include transmission power, antenna (e.g., physical antenna) orientation for a cell within the communication network, antenna electrical beam tilt for the cell, antenna steering for the cell, antenna type for the cell, frequency band, resource allocation, retransmission scheme, modulation and coding scheme, or cell layout network coverage capacity, transmit power, electrical beam forming, beam steering, or handover timers, among other parameters. For instance, frequency band can affect propagation characteristics of radio waves, and therefore impact coverage area. Lower frequency bands (e.g., sub-1 GHz) generally have better propagation through obstacles and longer range, while higher frequency bands (e.g., 6 GHZ) are more prone to signal attenuation and have shorter range. Transmission power may determine signal strength at the receiver and therefore affect coverage area. Increasing the transmission power can extend the coverage area but can also cause interference and reduce battery life of devices (e.g., client devices 106, service providers 108, network entities). Optimal transmission power may depend on network topology, user density, and available resources. Antenna type and orientation can affect the coverage area and the signal quality. Directional antennas can improve the signal strength and reduce interference in a specific direction, while omnidirectional antennas can provide coverage in all directions. The antenna orientation can also be adjusted to optimize the signal propagation towards the users (e.g., client devices 106). Cell layout may determine spatial distribution of the cells. Cell layout may affect coverage area and interference level. The optimal cell layout depends on user density, terrain, and traffic demand. Modulation and coding scheme may determine data rate and reliability of the communication. Increasing the modulation and coding scheme can improve the data rate but can also reduce signal quality and increase error rate. The optimal modulation and coding scheme depends on channel conditions, interference level, and QoS requirements. Resource allocation may determine how radio resources (e.g., frequency, time, power) are allocated to the users. The optimal resource allocation depends on user density, traffic demand, and QoS requirements. The network can be optimized for the full 24 hour day or optimized for selected time period(s), such as for a busy hour (e.g., when the most network traffic is transmitted across the network). The time frames can be chosen by the carrier.

Figure 2:
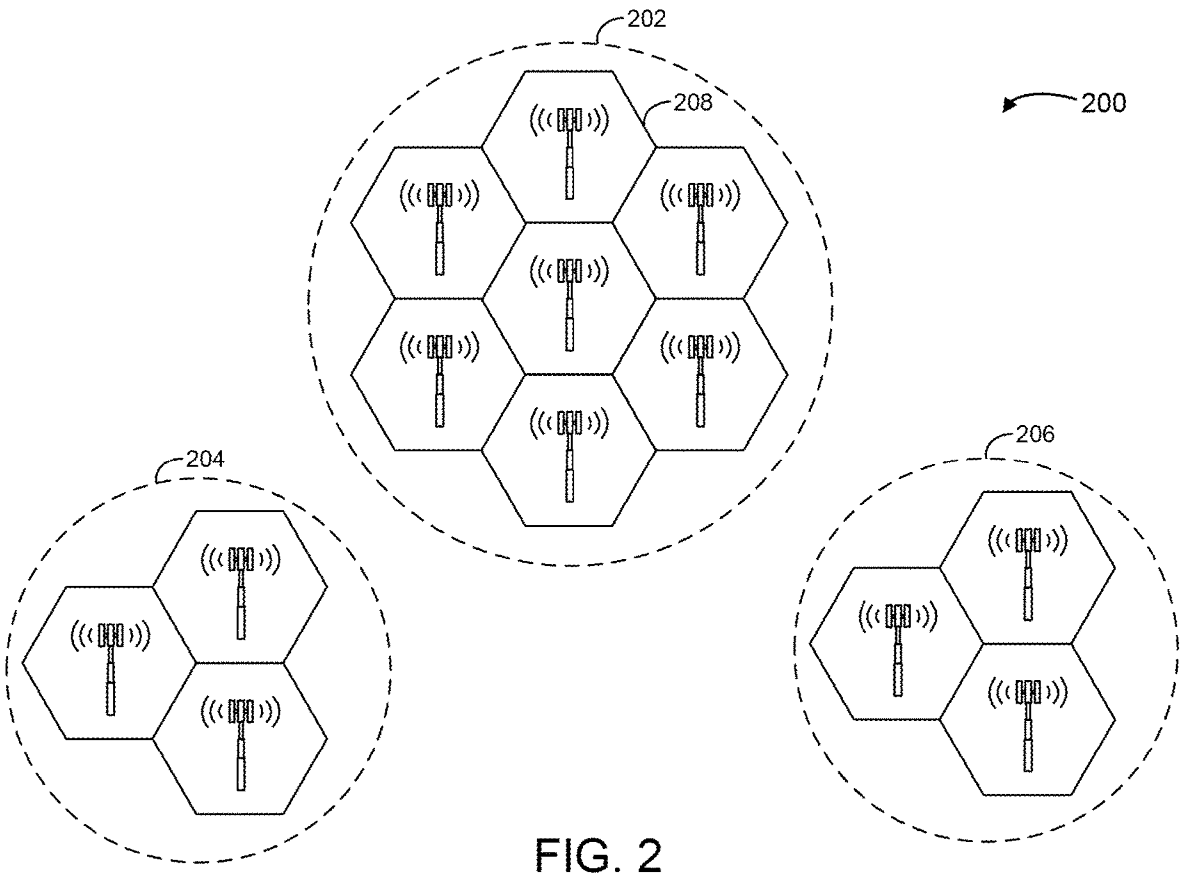
FIG. 2 is an illustration of a communication network for multi-objective radio network optimization, in accordance with an implementation.

FIG. 2 is an illustration of a communication network 200 for multi-objective radio network optimization, in accordance with an implementation. The environment 200 may include a first cell cluster 202, a second cell cluster 204, and a third cell cluster 206. The cell clusters 202-206 may further include one or more cells 208. Each cell 208 may include one or more network entities (e.g., base stations) that provide radio coverage to a geographical area surrounding the network entity. In some cases, the geographical area may overlap with other geographical areas covered by other cells 208. The cell clusters 202-206 may include various numbers of cells 208. For example, the first cell cluster 202 may correspond to a city center (e.g., downtown) where greater network traffic may occur. The second cell cluster 204 may correspond to a suburb where less network traffic may occur. Due to the higher traffic, the first cell cluster 202 may include more cells 208 than the second cell cluster 204.

A network controller (e.g., a data processing system, an external device) may configure the communication network 200 to optimize multiple network objectives. For example, the multiple objectives may include coverage and capacity. A data processing system may configure (e.g., select) one or more weights (e.g., priorities) for coverage and one or more weights for capacity per cell 208, per cell cluster 202-206, or per geographic area. To optimize for morphology, the data processing system may generate a mask by applying a first geographic weighting function. For example, each weight may correspond to a respective per cell mask or geographical mask. A first mask may be associated with capacity, where weighting may increase along the mask moving towards the center of the cell cluster 202 (e.g., a city center, a downtown core area) and decreases along the mask moving away from the center of the cell cluster 202 (e.g., like a mole hill) during a first time period (e.g., during the day) and reverse (e.g., increase outwards and decrease inwards like the top half of a doughnut) during a second time period (e.g., during the evening), as described herein with reference to FIG. 3. In this way, each area of each cell cluster 202-206 may be weighted with a different value that reflects an aspect of network communication (e.g., density of communication, network needs, population density). To optimize for intra-cell performance, the data processing system may generate one or more masks by applying a second geographic weighting function. The second geographic weighting function may be associated with cell edge and cell center weighting. For example, the mask may feature intra-cell scales. The masks may overlay on top of each other (e.g., each mask may correspond to a layer of weights). The intra-cell performance mask can be combined with the morphology mask and other selection criteria to choose an appropriate solution from the Pareto-optimal set. In some cases, the masks may be preconfigured, selected based on one or more parameters (e.g., time of day, geographic area, historical data, etc.), or selected by an operator. In some cases, the data processing system may select weights of radio bearer services (e.g., QoS, QoS class identifier (QCI), 5G QoS identifier (5QI)). In some cases, the data processing system may select network sliding indicators over non-sliced services.

The data processing system may execute the one or more models, configured by the weight masks, (e.g., optimization model, machine learning model) using network data packets of the communication network 200 as input. The input may further include geolocated cell trace records (CTRs) normalized for analytics uses, network element tables, handset tables including UE and cell site design/configuration, morphological maps (e.g., focusing on buildings), and RAN planning export pathloss predictions. The models may output network configuration parameters for the communication network 200. For instance, the output may include values for the network configuration parameters to be adjusted in the communication network 200. The output may include recommendations to tilt, azimuth, power, handover parameters, and a list of limits (e.g., cell coverage, wrong frequencies) that may prevent target optimization goals, among other parameters. In some cases, output including cell changes may be provided if optimization generalization (e.g., latency error) cannot meet objectives, which may result in decreasing resources spent on optimization where objectives can never be met. In some cases, the output may identify potential system issues to be addressed (e.g., carrier aggregation, neighbor cell relations, crossfeeder system issues, etc.). In response to generating the output, the data processing system may adjust the communications network according to the output (e.g., configure the communications network according to the recommended tilt, azimuth, power, handover parameters, and/or limits).

In some cases, the multiple objectives may include latency. For example, a modulation and coding scheme (MCS) may include tradeoffs between transmission efficiency and block error rate. Latency is dependent on block error rate because of increased probability of retransmission at the hybrid automatic repeat request (HARQ) and radio link control (RLC) layers from transmission block errors. By including latency as an optimization objective, the network can optimize mobile edge computing (MEC) or ultra-reliable low latency communication (URLLC) network slices.

Figure 3:
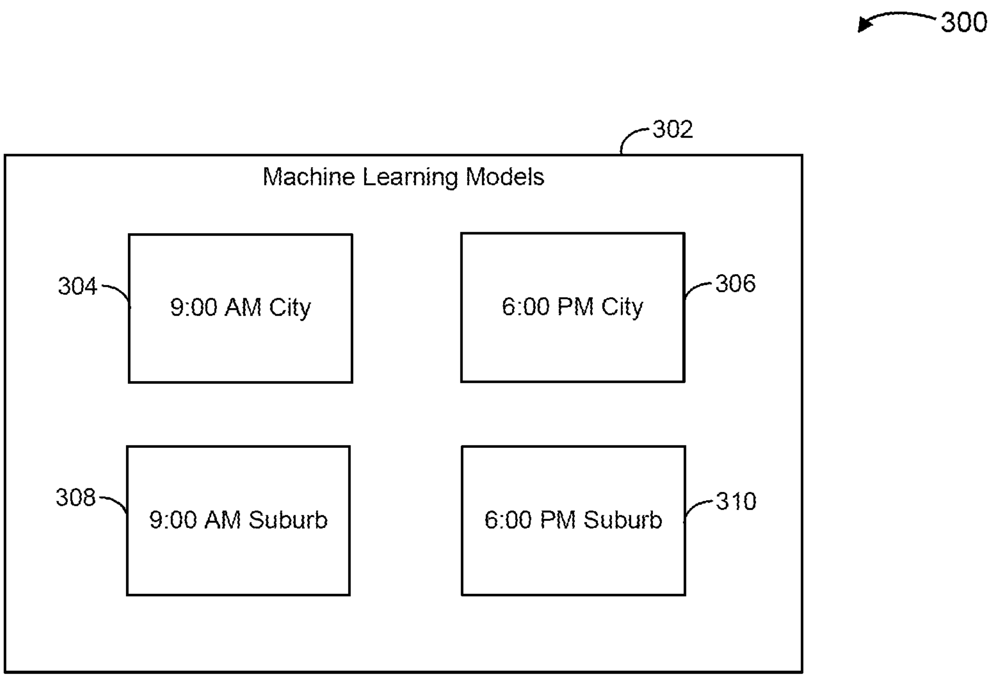
FIG. 3 is an illustration of a model for multi-objective radio network optimization, in accordance with an implementation.

FIG. 3 is an illustration of a model 300 for multi-objective radio network optimization, in accordance with an implementation. The model 300 may include one or more machine learning models 302. For example, the models 302 may include a first model 304 for a first time period (e.g., 9:00 AM) and a first geographical area (e.g., a city), a second model 306 for a second time period (e.g., 6:00 PM) and the first geographical area, a third model 308 for the first time period and a second geographical area (e.g., a suburb), and a fourth model 310 for the second time period and the second geographical area. Other models for other time period and location mappings are also considered.

A data processing system may configure a communication network to optimize for multiple network objectives. To do so, the data processing system may generate a mask of weighted values. The mask may indicate different weighted values based on location and time. For example, a first mask may be related to the first time period and the first geographical area, etc., for each combination of time periods and areas. By applying sector/cell geoanalytics (e.g., generating the masks dependent on location and time), sub cell radio frequency performance is incorporated in the multiple network objective optimization analysis. This may result in a more robust model that can optimize cell centers and edges and be configured for performance impact of adjacent cells.

The data processing system may execute one of the various models 304-310 to generate network configuration parameters for the communication network to optimize for the network objectives. The data processing system may select the model 304-310 to execute based on a current time period, area of interest, or both. Based on the output, the data processing system may adjust the communications network. The data processing system may separately execute the models 304-310 and configure the relevant portions of the communications network for the relevant time periods based on output parameters from the models 304-310 that correspond to the respective portions and time periods.

Figure 4:
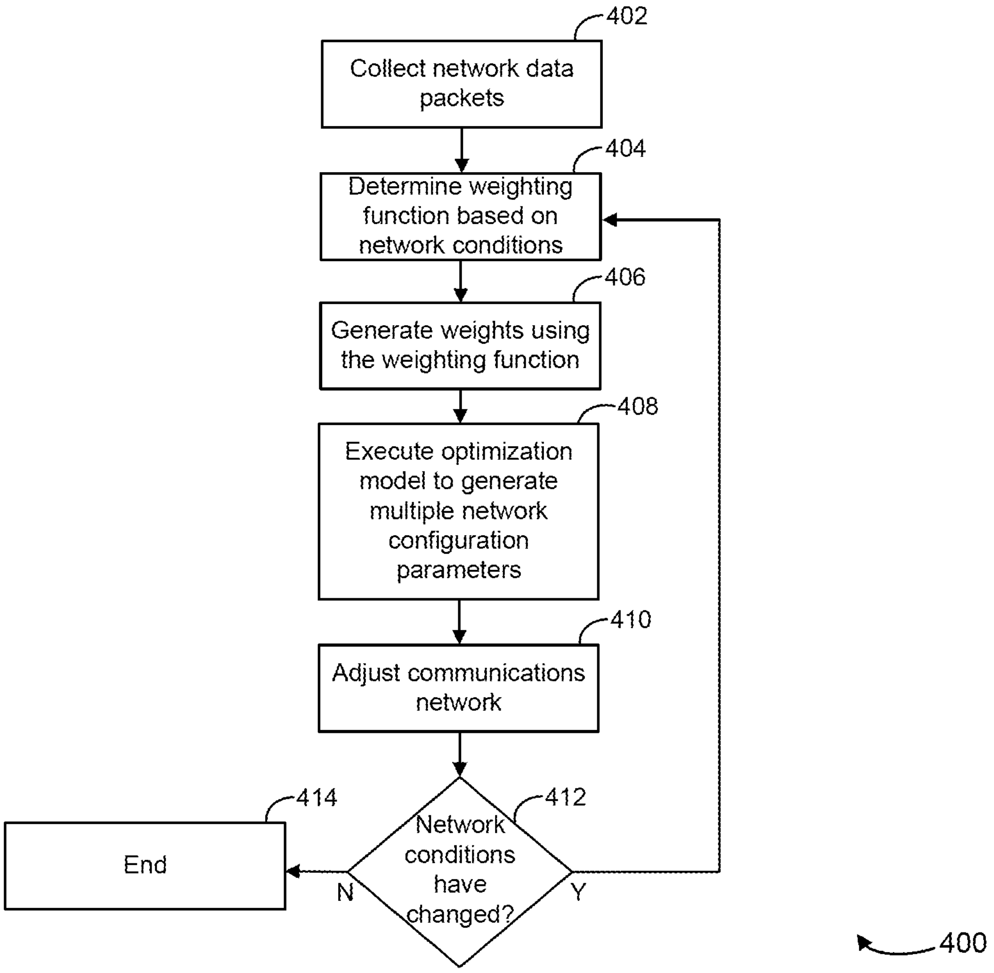
FIG. 4 is a method for multi-objective radio network optimization, in accordance with an implementation.

FIG. 4 is a method 400 for multi-objective radio network optimization, in accordance with an implementation. The method 400 can be performed by one or more system, component or module depicted in FIGS. 1-6C, including, for example, a data processing system or service of a cloud service provider system. The method 400 may include more or fewer operations and the operations may be performed in any order. Performance of the method 400 may enable the data processing system to adjust a communications network according to parameters optimized for multiple objectives.

At operation 402, the data processing system can collect network data packets. The data processing system can collect the network data packets from network monitoring equipment connected to a communications network. In some embodiments, the network data packets may be a part of a communication session between one or more client devices and one or more service providers. The network data packets may be serviced by one or more of a cell, a cluster of cells, or multiple clusters of cells.

At operation 404, the data processing system can determine a weighting function. The data processing system can determine the weighting function based on network conditions. For example, the data processing system can determine a weighting function based on time, geolocation, or cell performance. In some cases, the data processing system may determine the network conditions from the network data packets, may be preconfigured with the network conditions, or both.

At operation 406, the data processing system can generate weights using the weighting function. For example, the weighting function may generate a mask. The mask may include different weighted values for each area of a cell cluster. For instance, if a time period is set for the evening, the weighting function may generate a mask with higher weighted values approaching a center of a suburban area and decreasing approaching a center of a downtown area, or any other variation of increasing and decreasing values by changing area.

At operation 408, the data processing system can execute an optimization model. The data processing system can execute the optimization model using the network data packets as input to generate network configuration parameters for the communication network. The network configuration parameters can include one or more of transmission power, antenna orientation for a cell within the communication network, antenna type for the cell, frequency band, resource allocation, cell layout network coverage capacity, transmit power, electrical beam forming, beam steering, handover timers, or another configuration parameter associated with network configuration. Each of the network configuration parameters can be associated with a respective cell of multiple cells (e.g., a cell cluster) of the communications network. In some embodiments, the optimization model is an MOEA model.

In some embodiments, the optimization model can be configured with one or more predetermined weights for multiple performance metrics for the communications network. The data processing system can generate the one or more predetermined weights by applying one or more weighting functions, each weighting function of the one or more weighting functions configured according to at least one of geographic area, time period, or cell performance. The predetermined weights can be configured to minimize one or more of the performance metrics. The predetermined weights can be configured to maximize two or more of the performance metrics. The performance metrics can include two or more of signal strength, coverage probability, quality of service, interference management, dropped connection ratio, capacity, uplink and downlink throughput, energy consumption, quality of service class identifier (QCI)/5G quality of service (QOS) indicator (5QI) quality indicators, latency, or another performance metric associated with network performance.

In some embodiments, the data processing system can generate a feature vector from data of the network data packets collected within a defined time period. The data processing system can modify the defined time period from a first time period to a second time period. The data processing system can modify the one or more predetermined weights based on the modified defined time period. Responsive to modifying the one or more predetermined weights, the data processing system can execute the optimization model configured with the modified one or more predetermined weights to generate multiple second network configuration parameters for the communication network.

At operation 410, the data processing system can adjust the communications network. The data processing system can adjust the communications network according to the generated network configuration parameters. To do so, the data processing system can transmit a signal including the network configuration parameters to the communications network. In some embodiments, the data processing system can adjust the communications network according to the multiple second network configuration parameters.

At operation 412, the data processing system can determine whether network conditions have changed. For example, the data processing system can automatically determine conditions have changed (e.g., based on changing time periods, a notification from a monitoring device, from network data packets) or can be configured with new network conditions. If the network conditions have changed, the data processing system can return to operation 404 and determine a new weighting function based on the changed network conditions. If the network conditions have not changed, the data processing system can, at operation 414, end the multi-objective optimization process.

Figure 5:
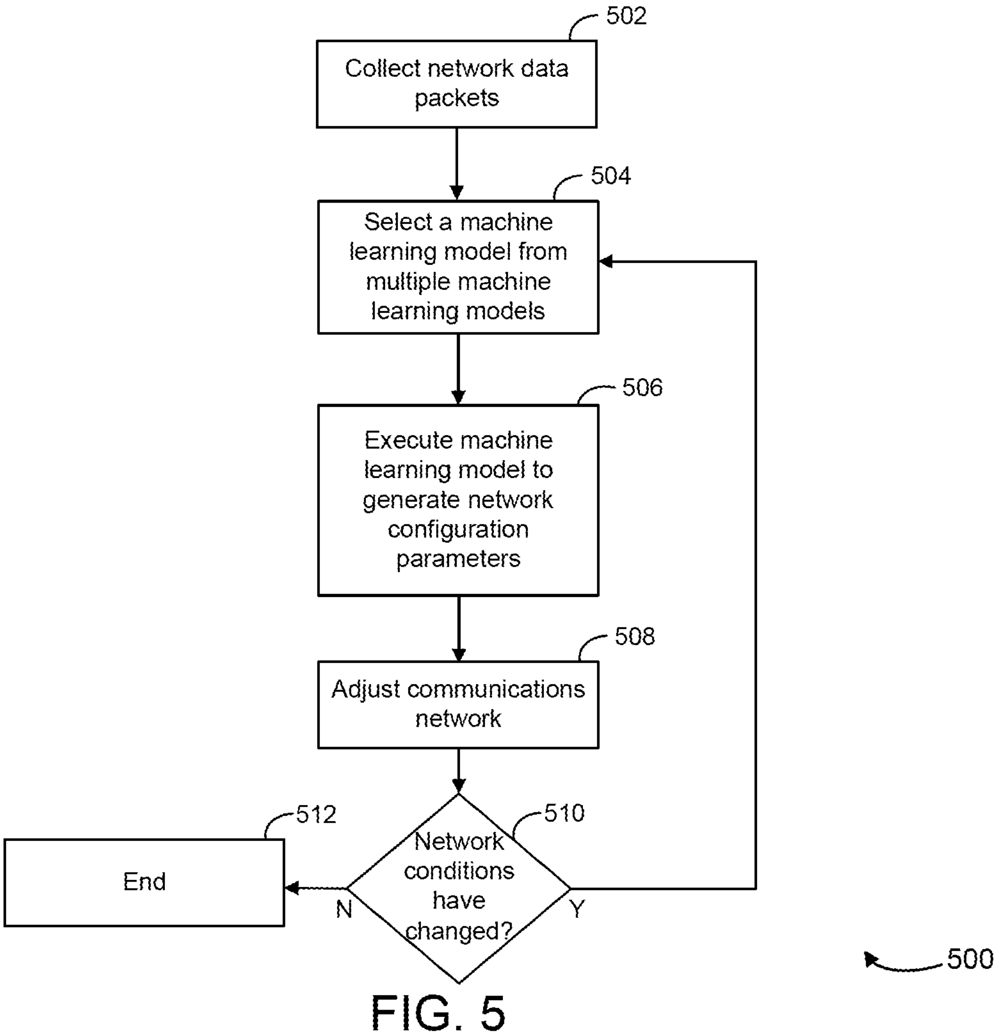
FIG. 5 is a method for multi-objective radio network optimization, in accordance with an implementation.

FIG. 5 is a method 500 for multi-objective radio network optimization, in accordance with an implementation. The method 500 can be performed by one or more system, component or module depicted in FIGS. 1-6C, including, for example, a data processing system or service of a cloud service provider system. The method 500 may include more or fewer operations and the operations may be performed in any order. Performance of the method 500 may enable the data processing system to adjust a communications network according to parameters optimized for multiple objectives.

At operation 502, the data processing system can collect multiple network data packets. The data processing system can collect the multiple network data packets from network monitoring equipment connected to a communications network. In some embodiments, the network data packets may be a part of a communication session between one or more client devices and one or more service providers. The network data packets may be serviced by one or more of a cell, a cluster of cells, or multiple clusters of cells.

At operation 504, the data processing system can select a machine learning model. The data processing system can select the machine learning model from multiple machine learning models. The multiple machine learning models may be trained based on different network conditions (e.g., various training data with different network conditions). For example, a first model may be associated with a first location and a first time period, a second model may be associated with a second location and the first time period, etc., with different location and time period mappings. In some cases, other network conditions may be changed to train various models. The data processing system can select the machine learning model based on current network conditions. The data processing system can determine the current network conditions based on a preconfiguration, a manual input, automatically (e.g., determining a current time period), or from the collected network data packets.

At operation 506, the data processing system can execute the selected machine learning model. The data processing system can execute the machine learning model using the multiple network data packets as input to generate multiple network configuration parameters for the communication network. The machine learning model can be trained to generate network configuration parameters that optimize multiple performance metrics for the communications network. In some embodiments, the multiple performance metrics may include two or more of signal strength, coverage probability, quality of service, interference management, latency, or another performance metric associated with network performance.

In some embodiments, the machine learning model is a reinforcement learning model. The machine learning model can be one of a first machine learning model trained to generate network configuration parameters for a first geographical area or a second machine learning model trained to generate network configuration parameters for a second geographical area, the machine learning model can be one of a first machine learning model trained to generate network configuration parameters for a first time period or a second machine learning model trained to generate network configuration parameters for a second time period.

At operation 508, the data processing system can adjust the communications network. The data processing system can adjust the communications network according to the generated multiple network configuration parameters. To do so, the data processing system can transmit a signal including the network configuration parameters to the communications network.

At operation 510, the data processing system can determine whether the network conditions have changed. For example, the data processing system can automatically determine conditions have changed (e.g., based on changing time periods, a notification from a monitoring device, from network data packets) or can be configured with new network conditions. If the network conditions have changed, the data processing system can return to operation 504 and select a new machine learning model based on the changed network conditions. If the network conditions have not changed, the data processing system can, at operation 512, end the multi-objective optimization process.

Figure 6A:
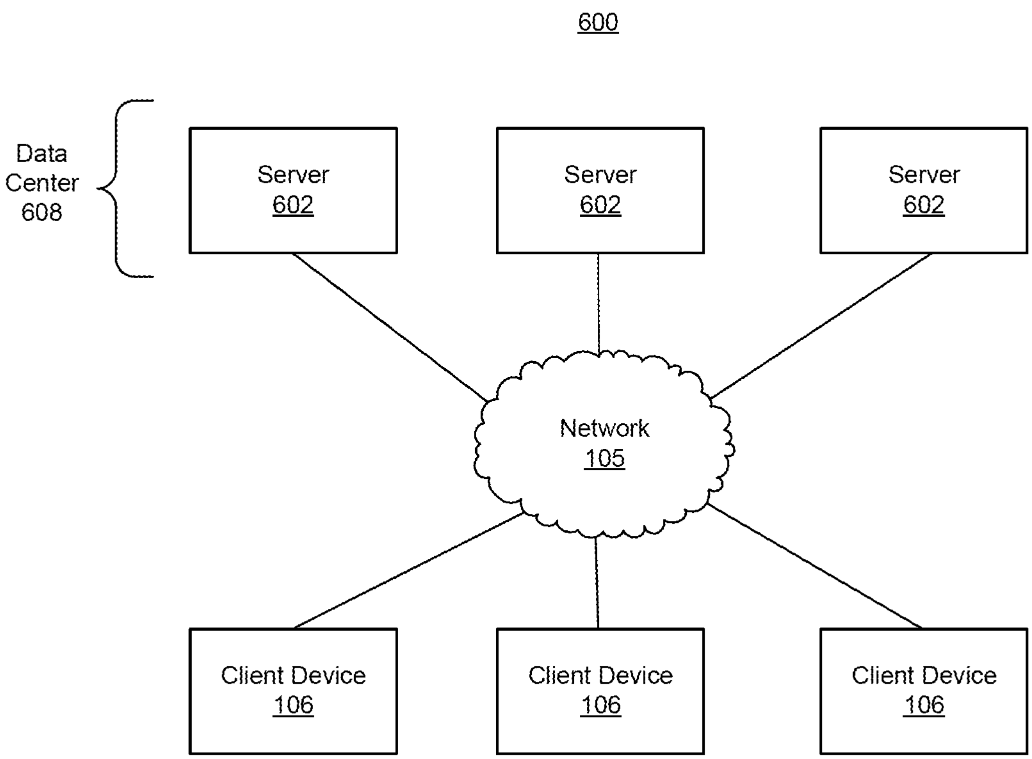
FIG. 6A is a block diagram depicting an implementation of a network environment including a client device in communication with a server device.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPV6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 602 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

Figure 6B:
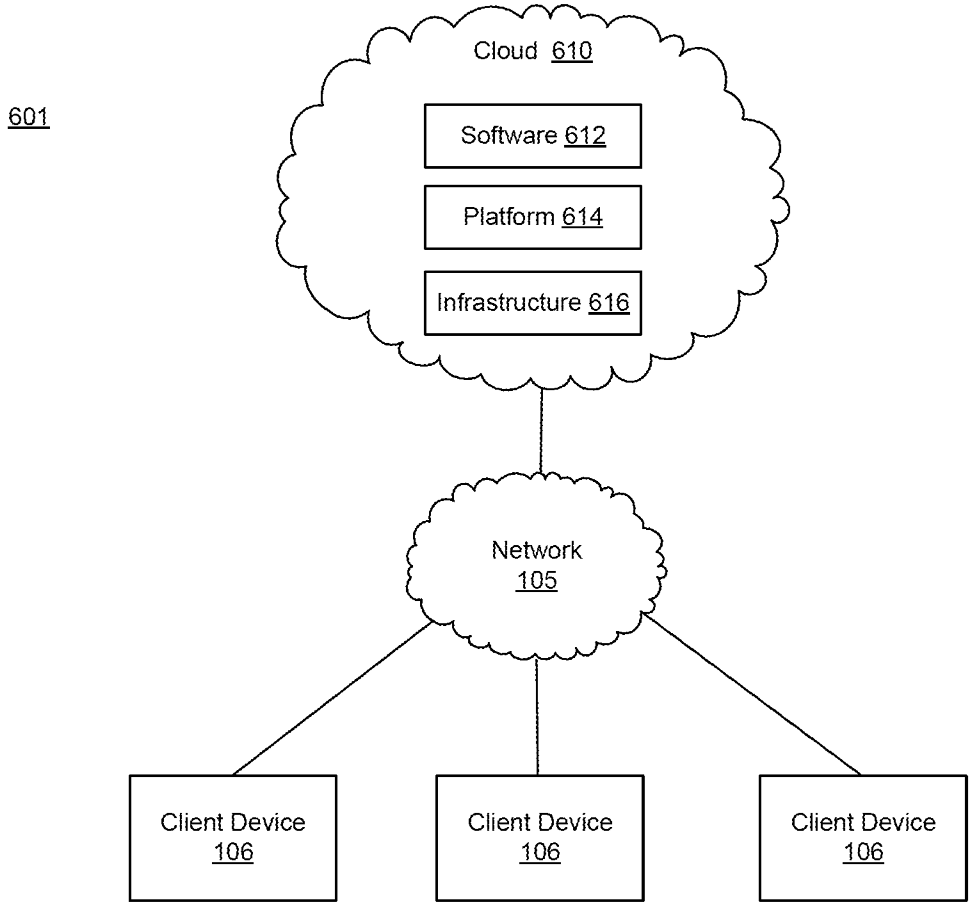
FIG. 6B is a block diagram depicting a cloud computing environment including a client device in communication with cloud service providers.

FIG. 6B illustrates an example cloud computing environment. A cloud computing environment 601 can provide client 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back-end platforms, e.g., servers 602, storage, server farms or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds 608 can include both the private and public networks 105 and servers 602.

The cloud 610 can also include a cloud-based delivery, e.g., Software as a Service (Saas) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 602 can be deployed as and/or executed on any type and form of computing device, e.g., a computer, network device or appliance capable of communicating on any type and form of network and performing the operations described herein.

Figure 6C:
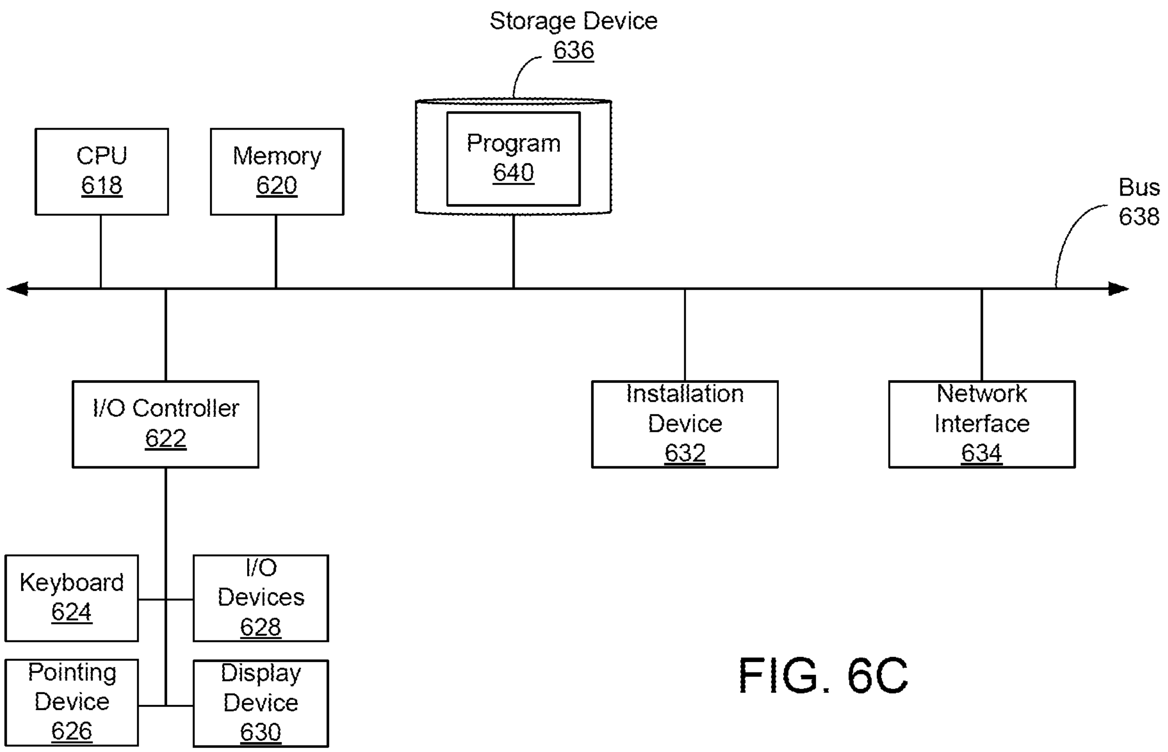
FIG. 6C is a block diagram depicting an implementation of a computing device that can be used in connection with the systems depicted in FIGS. 1-3, and the methods depicted in FIGS. 4 and 5.

FIG. 6C depicts block diagrams of a computing device 602 useful for practicing an embodiment of the client 106 or a server 602. As shown in FIG. 6C, each computing device 602 can include a central processing unit 618, and a main memory unit 620. As shown in FIG. 6C, a computing device 602 can include one or more of a storage device 636, an installation device 632, a network interface 634, an I/O controller 622, a display device 630, a keyboard 624 or a pointing device 626, e.g., a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 602 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random-access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 602. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 602. In embodiments, the computing device 602 can provide USB connections (not shown) to receive handheld USB storage devices. In embodiments, an I/O device 628 can be a bridge between the system bus 638 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 602. For example, the computing device 602 can include any type and/or form of video adapter, video card, driver, and/or library to interface, communicate, connect or otherwise use the display devices 630. In embodiments, a video adapter can include multiple connectors to interface to multiple display devices 630.

The computing device 602 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIG. 1, or 2. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 602 via a bus 638. Storage device 636 can be external and connect to the computing device 602 via an I/O device 630 that provides an external bus. Storage device 636 can connect to the computing device 602 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 602 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 602 can communicate with other computing devices 602 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem or any other device suitable for interfacing the computing device 602 to any type of network capable of communication and performing the operations described herein.

A computing device 602 of the sort depicted in FIG. 6C can operate under the control of an operating system, which controls scheduling of tasks and access to system resources. The computing device 602 can be running any operating system configured for any type of computing device, including, for example, a desktop operating system, a mobile device operating system, a tablet operating system, or a smartphone operating system.

The computing device 602 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 602 has sufficient processor power and memory capacity to perform the operations described herein. In some embodiments, the computing device 602 can have different processors, operating systems, and input devices consistent with the device.

In embodiments, the status of one or more machines 106, 602 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 602 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 602 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a method for multi-objective radio network optimization. The method can be performed by one or more processors. For example, the method can be performed by one or more processors of a data processing system or a cloud computing system via a virtual machine. The method can include collecting, by one or more processors, a plurality of network data packets from user equipment (UE or handset), network equipment, and/or monitoring equipment connected to a communications network. The method can include executing, by the one or more processors, an optimization model using the plurality of network data packets as input to generate a plurality of network configuration parameters for the communication network, the optimization model configured with one or more predetermined weights for a plurality of performance metrics for the communications network. The method can include adjusting, by the one or more processors, the communications network according to the generated plurality of network configuration parameters.

At least one aspect is directed to a system for multi-objective radio network optimization. The system can include one or more processors coupled with memory. The one or more processors can be configured to collect a plurality of network data packets from user equipment (UE or handset), network equipment, and/or monitoring equipment connected to a communications network. The one or more processors can be configured to execute an optimization model using the plurality of network data packets as input to generate a plurality of network configuration parameters for the communication network, the optimization model configured with one or more predetermined weights for a plurality of performance metrics for the communications network. The one or more processors can be configured to adjust the communications network according to the generated plurality of network configuration parameters.

At least one aspect is directed to a method for multi-objective radio network optimization. The method can be performed by one or more processors. For example, the method can be performed by one or more processors of a data processing system or a cloud computing system via a virtual machine. The method can include collecting, by one or more processors, a plurality of network data packets from user equipment (UE or handset), network equipment, and/or monitoring equipment connected to a communications network. The method can include executing, by the one or more processors, a machine learning model using the plurality of network data packets as input to generate a plurality of network configuration parameters for the communication network, the machine learning model trained to generate network configuration parameters that optimize a plurality of performance metrics for the communications network. The method can include adjusting, by the one or more processors, the communications network according to the generated plurality of network configuration parameters.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

collecting, by one or more processors, a plurality of network data packets from user equipment, network equipment or monitoring equipment connected to a communications network;

executing, by the one or more processors, an optimization model using the plurality of network data packets as input to generate a plurality of network configuration parameters for the communication network, the optimization model configured with one or more predetermined weights comprising weight vectors for a plurality of performance metrics for the communications network, the one or more predetermined weights configured to enable the optimization model by decomposing a multi-objective optimization into a plurality of single-objective optimization problems, each single-objective optimization problem corresponding to a respective target objective of a plurality of target objectives, each target objective corresponding to a respective performance metric of the plurality of performance metrics of the communication network; and adjusting, by the one or more processors, the communications network according to the generated plurality of network configuration parameters.

2. The method of claim 1, wherein the plurality of performance metrics comprises two or more of signal strength, coverage probability, quality of service, interference management, dropped connection ratio, capacity, uplink and downlink throughput, energy consumption, quality of service class identifier (QCI)/5G quality of service (QOS) indicator (5QI) quality indicators, or latency.

3. The method of claim 1, wherein the one or more predetermined weights are configured to minimize one or more of the plurality of performance metrics, or the one or more predetermined weights are configured to maximize two or more of the plurality of performance metrics.

4. The method of claim 1, wherein the plurality of network configuration parameters comprises one or more of transmission power, physical antenna orientation for a cell within the communication network, antenna electrical beam tilt for the cell, antenna steering for the cell, antenna type for the cell, frequency band, resource allocation, modulation and coding scheme, retransmission scheme, cell layout network coverage capacity, transmit power, electrical beam forming, beam steering, or handover timers.

5. The method of claim 1, further comprising:

generating, by the one or more processors, a feature vector from data of the plurality of network data packets collected within a defined time period.

6. The method of claim 5, further comprising:

modifying, by the one or more processors, the defined time period from a first time period to a second time period;

modifying, by the one or more processors, the one or more predetermined weights based on the modified defined time period; and responsive to modifying the one or more predetermined weights, executing, by the one or more processors, the optimization model configured with the modified one or more predetermined weights to generate a plurality of second network configuration parameters for the communication network.

7. The method of claim 6, further comprising:

adjusting, by the one or more processors, the communications network according to the plurality of second network configuration parameters.

8. The method of claim 1, further comprising:

generating, by the one or more processors, the one or more predetermined weights by applying one or more weighting functions, each weighting function of the one or more weighting functions configured according to at least one of geographic area, time period, or cell performance.

9. The method of claim 1, wherein each of the plurality of network configuration parameters are associated with a respective cell of a plurality of cells of the communications network.

10. The method of claim 1, wherein adjusting the communications network comprises:

transmitting, by the one or more processors, a signal comprising the plurality of network configuration parameters to the communications network.

11. The method of claim 1, wherein the optimization model is a multi-objective evolutionary algorithm (MOEA) model.

12. A system, comprising:

a data processing system comprising one or more processors coupled with memory, the data processing system configured to:

collect a plurality of network data packets from network monitoring equipment connected to a communications network;

execute an optimization model using the plurality of network data packets as input to generate a plurality of network configuration parameters for the communication network, the optimization model configured with one or more predetermined weights comprising weight vectors for a plurality of performance metrics for the communications network, the one or more predetermined weights configured to enable the optimization model by decomposing a multi-objective optimization into a plurality of single-objective optimization problems, each single-objective optimization problem corresponding to a respective target objective of a plurality of target objectives, each target objective corresponding to a respective performance metric of the plurality of performance metrics of the communication network; and adjust the communications network according to the generated plurality of network configuration parameters.

13. The system of claim 12, wherein the plurality of performance metrics comprises two or more of signal strength, coverage probability, quality of service, interference management, or latency, and wherein the plurality of network configuration parameters comprises one or more of transmission power, physical antenna orientation for a cell within the communication network, antenna electrical beam tilt for the cell, antenna steering for the cell, antenna type for the cell, frequency band, resource allocation, coding and modulation scheme, retransmission scheme, cell layout network coverage capacity, transmit power, electrical beam forming, beam steering, or handover timers.

14. The system of claim 12, wherein the one or more predetermined weights are configured to minimize one or more of the plurality of performance metrics, or the one or more predetermined weights are configured to maximize two or more of the plurality of performance metrics.

15. The system of claim 12, wherein the data processing system is further configured to:

generate the one or more predetermined weights by applying one or more weighting functions, each weighting function of the one or more weighting functions configured according to at least one of geographic area, time period, or cell performance.

16. A method comprising:

collecting, by one or more processors, a plurality of network data packets from network monitoring equipment connected to a communications network;

executing, by the one or more processors, a machine learning model using the plurality of network data packets as input to generate a plurality of network configuration parameters for the communication network, the machine learning model trained to generate network configuration parameters that optimize a plurality of performance metrics for the communications network, the machine learning model trained using a reward function comprising a weighted sum of the plurality of performance metrics, the reward function designed to reflect trade-offs between the plurality of performance metrics of the communication network; and adjusting, by the one or more processors, the communications network according to the generated plurality of network configuration parameters.

17. The method of claim 16, wherein the plurality of performance metrics comprises two or more of signal strength, coverage probability, dropped connection ratio, capacity, uplink and downlink throughput, energy consumption, quality of service, interference management, quality of service class identifier (QCI)/5G QOS Indicator (5QI) quality indicators, or latency.

18. The method of claim 16, wherein the machine learning model is one of a first machine learning model trained to generate network configuration parameters for a first geographical area or a second machine learning model trained to generate network configuration parameters for a second geographical area.

19. The method of claim 16, wherein the machine learning model is one of a first machine learning model trained to generate network configuration parameters for a first time period or a second machine learning model trained to generate network configuration parameters for a second time period.

20. The method of claim 16, wherein the machine learning model is a reinforcement learning model.

* * * * *